United States Patent

[11] 3,558,843

[72] Inventor Thomas J. O'Connor
 100 Morgan Road, Ann Arbor, Mich. 48104
[21] Appl. No. 631,329
[22] Filed Apr. 17, 1967
[45] Patented Jan. 26, 1971

[54] MEANS FOR AND METHOD OF ELECTRICAL MACHINING WITH A HEATED ELECTRODE
 10 Claims, 4 Drawing Figs.
[52] U.S. Cl. .................................................. 219/69, 204/143
[51] Int. Cl. ...................................................... B23p 1/08, B23p 1/04
[50] Field of Search .......................................... 219/69(E), 69(M), 58, 91, 119, 234; 219/70; 204/143(ECM); 204/224; 219/69

[56] References Cited
UNITED STATES PATENTS
3,002,907 10/1961 Williams ..................... 204/143(ECM)
3,134,883 5/1964 Bennett et al. ............... 219/119
3,263,059 7/1966 Rzant ........................... 219/91
3,030,544 4/1962 Zamboldi et al. ............. 219/70X
3,244,852 4/1966 Herterick et al. ............. 219/69(E)

*Primary Examiner*—R. F. Staubly
*Attorney*—Whittemore, Hubert & Belknap

ABSTRACT: The method of electrically machining conducting workpieces to produce a better finish with lower electrode wear and greater stock removal, using an electrode including a core of high electrical resistance material coated with a low electrical resistance material, and including heating the electrode during machining and providing a positive polarity for the electrode relative to the workpiece and the apparatus therefor. When the electrode material has semiconductor properties it is polarized to provide maximum conductivity between the electrode and workpiece with the electrode positive. The principles of coating, heating and polarizing the electrode during electrical machining may be separately employed.

PATENTED JAN 26 1971 3,558,843

INVENTOR
THOMAS J. O'CONNOR
BY Whittemore, Hulbert & Belknap
ATTORNEYS 3,558,843

MEANS FOR AND METHOD OF ELECTRICAL MACHINING WITH A HEATED ELECTRODE

SUMMARY OF THE INVENTION

The invention relates to electrical machining and refers more specifically to means for and a method of removing material from an electrically conducting workpiece by electrical discharge machining or the like at a high stock removal rate with low electrode wear and a better finish than has previously been possible.

In electrical machining at least three parameters of the machining process are limiting. These three parameters are the stock removal rate, electrode wear, and finish. The electrode wear parameter has to do with the ratio of wear of an electrode tool to wear of a workpiece being machined by the electrode tool. The higher the electrode wear ratio is the less desirable it is since it is difficult to economically maintain machining tolerances with a high electrode wear ratio. With regard to the other two parameters it is desirable to remove metal being machined as fast as possible while providing as smooth a finish as possible. These last two parameters are generally mutually exclusive, that is to say, the higher the stock removal rate the rougher the finish usually is.

It is desirable in electrical machining to increase each of the electrode wear ratio, stock removal rate and smoothness of finish. If this could be efficiently accomplished electrical machining would be even more widely used today than it is to replace conventional mechanical machining.

It is therefore an object of the present invention to provide improved structure for electrical machining of electrically conducting workpieces.

Another object is to provide structure for electrical machining of a conducting workpiece including an electrode tool, a power supply, means for connecting one terminal of the power supply to the electrode tool and the other terminal of the power supply to the workpiece, means for moving the electrode tool and workpiece relative to each other and means for heating the electrode tool during machining of the workpiece thereby.

Another object is to provide structure as set forth above wherein the positive terminal of the power supply is connected to the electrode tool and the negative terminal is connected to the workpiece.

Another object is to provide structure for electrical machining as set forth above wherein the electrode tool is constructed of a core of material having a relatively high electrical resistance coated with a material having a relatively low electrical resistance.

Another object is to provide structure as set forth above wherein the electrode tool is carbon polarized to permit maximum electron flow between the electrode tool and workpiece.

Another object is to provide an improved method of electrical machining of electrically conducting workpieces.

Another object is to provide a method of electrical machining of electrically conducting workpieces comprising connecting the opposite terminals of a power supply to an electrode tool and an electrically conducting workpiece heating the electrode tool and moving the electrode tool and workpiece into machining relation to each other.

Another object is to provide a method of electrical machining as set forth above and further including constructing the electrode of a core of relatively high resistance material with a coating of a relatively low resistance material.

Another object is to provide an electrode tool for electrically machining a conductive workpiece or the like comprising a core of relatively high resistance material and a coating of relatively low resistance material.

Another object is to provide an electrode tool constructed of carbon polarized to permit maximum electron flow therethrough.

Another object is to provide an electrode tool as set forth above and further including means integral therewith for heating the electrode tool in use.

Another object is to provide means for and a method of electrical machining which is simple, economical and efficient.

DESCRIPTION OF THE DRAWINGS

Other objects and features of the invention will become apparent as the description proceeds, especially when taken in conjunction with the accompanying drawing illustrating a preferred embodiment of the invention, wherein.

DESCRIPTION OF THE PREFERRED EMBODIMENTS

Figure 1:
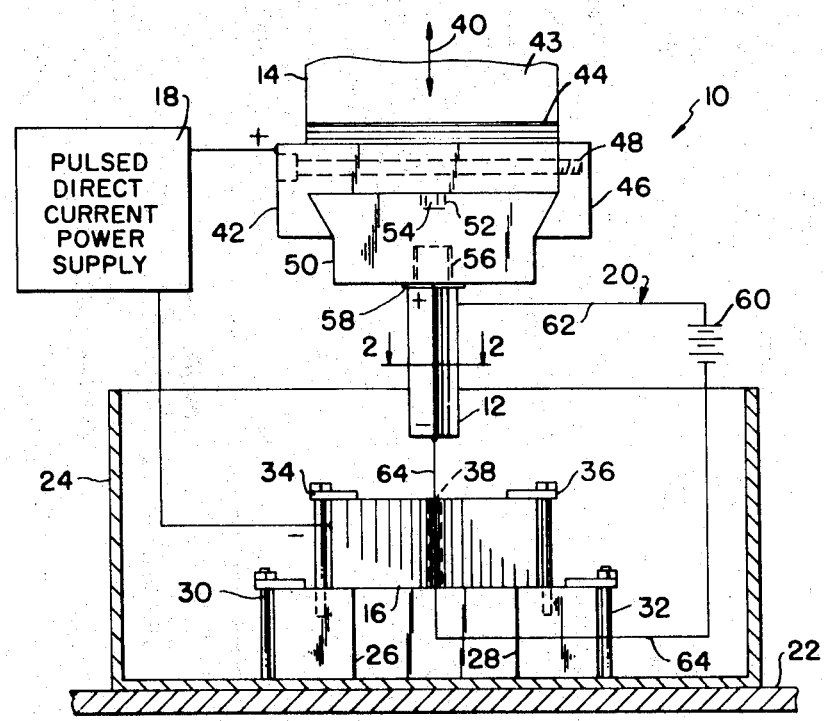
FIG. 1 is a partially diagrammatic, partially schematic representation of structure for electrical machining of a conductive workpiece in accordance with the method of the invention.

With particular reference to the figures of the drawing, one embodiment of the present invention will now be considered in detail.

As shown in FIG. 1 the electrical machining structure 10 includes the electrode tool 12, the ram means 14 for supporting the electrode tool 12 above the workpiece 16 and moving the electrode tool 12 relatively to the workpiece 16 and the electrical power supply 18, the negative terminal of which is connected to the workpiece 16 and the positive terminal of which is connected to the electrode tool 12 through the ram means 14. The electrical machining structure 10 as shown in FIG. 1 further includes the means 20 for heating the electrode tool 12 during machining.

In operation the electrically conducting workpiece 16 is supported in a fixed position. The electrode tool 12 is secured to the ram means 14 and is heated by the heating means 20. The electrode tool 12 is then moved toward the electrically conducting workpiece 16 by the ram means 14 with the power supply 18 connected to the electrode tool 12 through the ram means 14 and to the electrically conducting workpiece 16 with the polarity shown. As the electrode tool 12 approaches the electrically conducting workpiece 16, the workpiece 16 is machined in the configuration of the electrode tool 12.

With such operation and due to the polarity and heating of the electrode tool 12, by the electrode tool-heating means 20 and the construction of the electrode tool 12, that is with a relatively high resistance core polarized to permit maximum electron flow and a relatively low resistance coating on the high resistance core, the machining of the workpiece 16 is carried on at a high stock removal rate with a smoother finish than would ordinarily be expected for the stock removal rate. In addition the electrode wear ratio is extremely low whereby the tolerances of the form machined in the workpiece may be maintained closer than previously possible, with similar machining.

More specifically the structure for electrical machining 10 is structure for electrical discharge machining and includes the table 22 which may be moved universally in its own plane perpendicular to the electrode tool 12 in accordance with the usual movement of the tables of electrical discharge machining structure. A tank 24 is positioned on the table 22 in which the workpiece 16 is supported. The tank 24 permits maintaining the workpiece 16 and working portion of the electrode tool 12 in a dielectric such as oil, which is again usual in electrical discharge machining.

As shown in FIG. 1 the workpiece 16 is supported on blocks or manifolds 26 and 28 within the tank 24. The blocks or manifolds 26 and 28 are held in a fixed position by means of the locking devices 30 and 32 which may be positioned within the tank 24 as desirable in the usual manner. The workpiece 16 which is electrically conducting material is held in position on top of the blocks or manifolds 26 and 28 by the locking devices 34 and 36 which are secured in the blocks or manifolds 26 and 28 as shown. Thus the electrically conducting workpiece 16 which has an opening 38 extending therethrough is held in a rigid position within the tank 24.

The ram means 14 may be moved vertically in the direction of the arrows 40 in accordance with the usual operation of electrical discharge machining structure. The dovetail quick change tooling head 42 is electrically insulated from the slide 43 of the ram means 14 by the is insulating material 44 and is secured to the ram means 14 for vertical movement therewith. The dovetail tooling head 42 includes the one movable side 46 which is adjustable by means of the screw 48 to receive the electrode tool holding dovetail mounting member 50 as shown. A locating recess 52 is provided in the dovetail mounting member 50 which cooperates with the locating stud 54 in the tooling head 42 to accurately and rapidly position the electrode mounting member 50 in the tooling head 42.

The electrical discharge machining power supply 18 is shown connected to the workpiece 16 at the negative terminal and to the electrode tool 12 at the positive terminal through the tooling head 42 and the mounting member 50. As is the usual case the power supply 18 supplies pulsed electrical energy between the electrode tool 12 and the electrically conducting workpiece 16 to produce machining of the workpiece 16 as the electrode tool 12 is moved toward the workpiece with a dielectric fluid in the space between the electrode tool 12 and workpiece 16.

Figure 2:
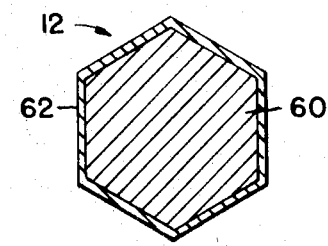
FIG. 2 is an enlarged cross section view of the electrode tool of the electrical machining structure illustrated in FIG. 1 taken substantially on the line 2-2 in FIG. 1.

The electrode tool 12, as shown in FIGS. 1 and 2, has a hexagonal-shaped cross section and is provided with a threaded stud 56 at one end thereof by which it is secured to the mounting member 50. The stud 56 is either integral with or secured to a mounting flange 58. The mounting flange 58 is in turn secured to an inner core of relatively high resistance material such as carbon graphite 60 by convenient means such as brazing. The carbon core 60 is polarized to provide maximum conductivity of electrons therethrough with the polarity of the power supply connections as shown. Carbon core 60 is then plated with a material of relatively high electrical conductivity 62 such as copper.

Such an electrode tool 12 has been found to provide an extremely low electrode wear ratio with a much higher stock removal rate and a better finish than either a pure high resistance electrode such as carbon or a pure low resistance electrode such as copper. The wear ratio and stock removal rate may be enhanced by a factor of two or three with electrodes constructed as illustrated in FIGS. 1 and 2 when used in electrical discharge machining.

The electrode wear ratio, stock removal rate and finish of the workpiece 16 may be further enhanced by positively heating the electrode tool 12 during electrical machining therewith. Thus in accordance with the invention the means 20 for heating the electrode tool 12 is provided.

The means 20 for heating the electrode tool 12 includes a direct current source 60 connected between the ends of the electrode tool 12 by means of the conductors 62 and 64. The direct current passing through the electrode tool 12 will produce heat in the electrode tool 12 which apparently permits more sparking to occur between the electrode tool 12 and the workpiece 16 without the wearing effect on the electrode tool 12 which is present when electrical machining is accomplished with cold electrode tools.

Figure 3:
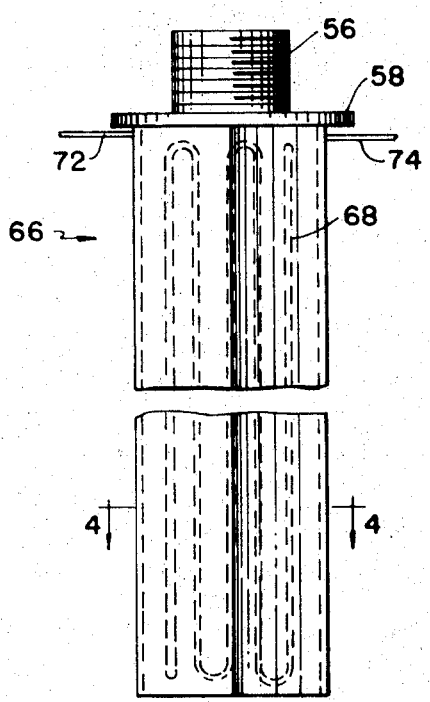
FIG. 3 is a broken elevation view of an electrode tool constructed in accordance with the invention similar to the tool of FIGS. 1 and 2 and including means integral therewith for heating the electrode tool.
Figure 4:
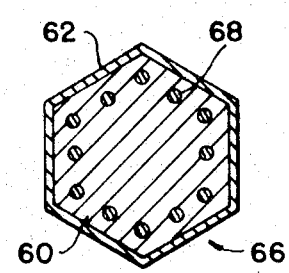
FIG. 4 is a cross section view of the electrode tool illustrated in FIG. 3 taken substantially on the line 4-4 in FIG. 3.

The heating of the electrode 12 need not be limited to passing a direct current directly through the electrode tool 12 from a direct current source 60. Thus as illustrated in the modification 66 of the electrode tool 12 illustrated in FIGS. 3 and 4, in which modification the same elements are given the same reference numerals as they are in electrode tool 12, a separate electrically conducting heater 68 may be manufactured in the carbon core 60 and connected to the opposite terminals of a source of electricity (not shown) through the conductors 72 and 74 connected to the opposite ends of the heater 68. The modified electrode tool 66 has a particular advantage where it is not desired to pass a hole such as the hole 38 through a workpiece to enable the opposite terminals of the source of heating electrical energy to be connected to the opposite ends of the electrode tool.

While different means for heating the electrode tools 12 and 66 have been illustrated it will be understood that the electrode tools may be heated by still other means. For example, plates having a gap therebetween may be positioned within the electrode tool and connected to opposite terminals of a high frequency electrical energy source. With any means for heating the electrode tools it will of course be understood that the heating means must be placed so as not to be worn away by erosion of the electrode tool.

Similarly while one example of the material of which the electrode tools 12 and 66 are constructed has been given as being a polarized carbon core and a copper plating which may be very thin, as for example one thousandth of an inch thick, other materials having similar properties electrically such as brass for the coating and various carbon compositions such as lead oxide and carbon powder heated and pressed into a cast electrode core may be used. In addition it will be understood that any of a polarized, coated or heated electrode will produce improved machining results and all may be used together to produce improved machining results.

In overall operation of the structure 10 for electrical machining of electrically conducting workpieces a workpiece 16 is secured within the tank 24 on the blocks 26 and 28 in a rigid position beneath the electrode tool 12. The electrode tool 12 is secured to the ram means 14 by the tooling head 42 and the mounting member 50. The electrode heating means 20 is then connected to the electrode tool 12 and the power supply 18 is connected to the electrode tool 12 through the tooling head 42 and mounting member 50 and to the workpiece 16 with the polarity as shown.

The ram means 14 is then moved down to place the electrode tool 12 in sparking relation with the workpiece 16 with fluid dielectric therebetween and machining is accomplished with a polarized heated and coated electrode. A very high stock removal rate, a better finish than usual and a very low electrode wear ratio will result due to the construction of and heating of the electrode tool 12 and the polarity of the power supply connections.

While one embodiment of the present invention has been considered in detail along with a modification thereof it will be understood that other embodiments and modifications are contemplated by the inventor. It is the intention to include all embodiments and modifications as are defined by the appended claims within the scope of the invention.

I claim:

1. Electrical machining structure for machining an electrically conductive workpiece, comprising means for supporting a workpiece, means for supporting an electrode tool in spaced relation to the workpiece, an electrode tool secured to the electrode tool supporting means, a dielectric material filling the space between the electrode tool and workpiece, an electrical power supply, means connecting the opposite terminals of the electrical power supply to the electrode tool and to a workpiece supported by the workpiece supporting means to provide an anodic tool, means for moving the electrode tool and workpiece relative to each other, and separate means for heating the electrode tool independently of the electrical power supply and dielectric.

2. Structure as set forth in claim 1, wherein the power supply is a direct current power supply and the means for moving the electrode tool and workpiece relative to each other is a servosystem responsive to the electric signal across the gap between the electrode tool and workpiece for maintaining a predetermined gap therebetween.

3. Structure as set forth in claim 1, wherein the separate means for independently heating the electrode tool comprises a separate source of electrical energy the opposite terminals of which are connected to opposite ends of the electrode tool.

4. Structure as set forth in claim 3, wherein the separate source of electrical energy is a source of direct current electrical energy.

5. Structure as set forth in claim 3, and further including electrical resistance means positioned in the electrode tool to which the opposite ends of the separate source of electrical energy are connected.

6. Structure as set forth in claim 1, wherein the electrode tool is constructed of a core and coating of materials having substantially different electrical conductivity.

7. Structure as set forth in claim 1, wherein the electrode tool is constructed of at least one material which is electrically polarized so that current passes therethrough more readily in one direction than in another.

8. The method of electrically machining conducting material comprising placing an anodic electrode tool and an electrically conducting workpiece in predetermined spaced-apart relation in a dielectric material, heating the electrode tool separately and independently of the dielectric material and impressing an electrical potential between the anodic electrode tool and workpiece to produce an electrical discharge therebetween.

9. The method as set forth in claim 8, and further including coating the electrode with a material having an electrical conducting characteristic different from the electrode.

10. The method as set forth in claim 8, and further including electrically polarizing the electrode.